(12) United States Patent
Hanson et al.

(10) Patent No.: US 11,591,277 B2
(45) Date of Patent: Feb. 28, 2023

(54) PHOTOCHEMICAL SEPARATIONS AND COMPOSITIONS

(71) Applicant: The Florida State University Research Foundation, Inc., Tallahassee, FL (US)

(72) Inventors: Kenneth Hanson, Tallahassee, FL (US); Thomas Edward Schoenzart, Tallahassee, FL (US); Sahan Salpage, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 461 days.

(21) Appl. No.: 16/631,574

(22) PCT Filed: Jul. 20, 2018

(86) PCT No.: PCT/US2018/043039
§ 371 (c)(1),
(2) Date: Jan. 16, 2020

(87) PCT Pub. No.: WO2019/018735
PCT Pub. Date: Jan. 24, 2019

(65) Prior Publication Data
US 2020/0172450 A1    Jun. 4, 2020

Related U.S. Application Data

(60) Provisional application No. 62/535,514, filed on Jul. 21, 2017.

(51) Int. Cl.
| | |
|---|---|
| *C07B 63/02* | (2006.01) |
| *C07F 5/00* | (2006.01) |
| *C07F 15/00* | (2006.01) |
| *C07F 15/02* | (2006.01) |

(52) U.S. Cl.
CPC ............. *C07B 63/02* (2013.01); *C07F 5/003* (2013.01); *C07F 15/0026* (2013.01); *C07F 15/0053* (2013.01); *C07F 15/025* (2013.01)

(58) Field of Classification Search
CPC .......... B01D 2255/802; B01D 2257/60; B01D 2259/804
See application file for complete search history.

(56) References Cited

U.S. PATENT DOCUMENTS

2005/0227071 A1\* 10/2005 Muraoka ................ B82Y 10/00
428/407

FOREIGN PATENT DOCUMENTS

EP    0142291 A1    5/1985

OTHER PUBLICATIONS

PCT International Search Report and Written Opinion for PCT Application No. PCT/US2018/043039 dated Oct. 18, 2018 (8 pages).
Bogaert et al., "Photochemical Recycling of Europium from Eu/Y Mixtures in Red Lamp Phosphor Waste Streams," Green Chem., 2015, 17:2180-2187.

\* cited by examiner

*Primary Examiner* — Pancham Bakshi
(74) *Attorney, Agent, or Firm* — Eversheds Sutherland (US) LLP (57) ABSTRACT

Provided herein are photochemical separations. The methods herein can include exposing a first metal complex and a second metal complex to light to facilitate an irreversible chemical reaction to form a modified first metal complex. The modified first metal complex then may be separated from the second metal complex. Compositions also are provided.

8 Claims, 10 Drawing Sheets

Ru(tpy)(tpy-Ph-N₂)³⁺

PHOTOCHEMICAL SEPARATIONS AND COMPOSITIONS

CROSS-REFERENCE TO RELATED APPLICATIONS

This application claims priority to U.S. Provisional Patent Application No. 62/535,514, filed Jul. 21, 2017, which is incorporated herein by reference.

STATEMENT REGARDING FEDERALLY SPONSORED RESEARCH OR DEVELOPMENT

This invention was made with government support under contract number DE-SC0016568 awarded by U.S. Department of Energy. The government has certain rights in the invention.

BACKGROUND

Due to cost, public safety concerns, or a combination thereof, there is demand for improved methods of separating metal ions in a number of applications, ranging from water purification to nuclear waste management. A number of separation strategies have been employed, such as transmutation, ion exchange, and redox chemistry, which can be expensive, have limited selectivity, and/or can be ineffective due to the similarity of at least one of charge density, size, or binding affinity of the metal ions.

For example, due at least in part to their similar atomic radius and binding affinities, separating lanthanide and actinide ions, such as Am(III) and Cm(III), using chelating agents or ion exchange resins can be difficult.

Considerable effort has been dedicated to using electrochemical reactions (see, e.g., Dares, C. J. et al., *Science.*, 2015, 350, 652-655) or chemical redox reactions (see, e.g., Mincher, B. J. et al., *Inorg. Chem.*, 2008, 47, 6984-6989) to generate and separate the oxidized/reduced products.

However, these reactions typically require harsh redox reagents, high applied potentials, or a combination thereof, which can lead to one or more difficulties, such as the degradation of a solvent and/or electrodes.

Reversible photoinduced electron transfer reactions have been demonstrated with Yb(III) (Nakashima, N. et al. *J. Phys. Chem. A.*, 2013, 47, 8352-8359), Eu(III) (Kusaba, M. et al., *Chem. Phys. Lett.* 1994 221 407-411), and Sm(III) halide complexes (Nishida, D. et al., *J. Phys. Chem A.*, 2010, 114, 5648-5654).

Photochemical separations, which can use light to facilitate chemical transformations, may achieve separations by relying on one or more intrinsically unique photophysical properties of a metal ion, coordination complex, or a combination thereof.

A common type of photochemical separation occurs by way of photo-reduction. where, upon excitation, a metal ion is reduced and then separated via coordination with a suitable precipitating agent (Borgarello, E. et al., *Inorg. Chem.*, 1986, 25, 4499; Donohue, T., *Chem. Phys. Lett.*, 1977, 48, 119; Donohue, T., *J. Chem, Phys.*, 1977, 67, 5402; and Van den Bogaert, B. et al., *Green Chem.*, 2015, 17, 2180). Although photochemical separations can be used for some rare earths and several d-block elements, the technique typically relies on high-energy irradiation (e.g., 150 nm to 300 nm), relatively expensive light sources, hazardous acids, or a combination thereof. The technique also can be unreliable with metals that have high reduction potentials, or for solutions that include more easily reduced ions/solvents.

There remains a need for separation methods that do not include the use of harsh redox agents and/or reaction conditions, high applied potentials, or a combination thereof. There also remains a need for separation methods that do not rely on the solubility and/or binding affinity of a metal ion, but, instead, on an intrinsically unique absorption spectrum of a metal complex and/or the properties of a reacted ligand.

BRIEF SUMMARY

Provided herein are methods of separation that overcome one or more of the foregoing disadvantages. The methods of separation may occur via photoinduced electron transfer. For example, the methods may require less harsh reaction conditions than known techniques, due at least in part to the fact that an excited state species may be easier to oxidize/reduce than a ground state species. Moreover, the methods provided herein, in some embodiments, selectively excite one species versus another, and the selective excitation at a narrow absorption feature may increase the reactivity of one species while leaving the second species substantially unperturbed.

Provided herein are methods of separation, including methods of photochemical separation. In some embodiments, the methods include providing a first metal complex and a second metal complex in a liquid, wherein the first metal complex and the second metal complex include a first ligand functionalized with an electron acceptor group; and exposing the liquid to light. The light may include one or more wavelengths sufficient to facilitate (i) the formation of an excited state on the first metal complex, (ii) an excited state electron transfer to the electron acceptor group of the first metal complex, and (iii) an irreversible chemical reaction of the electron acceptor group of the first metal complex, wherein the irreversible chemical reaction converts the first ligand of the first metal complex to a second ligand to form a modified first metal complex. The methods, in some embodiments, also include reducing the modified first metal complex. The modified first metal complex also may be separated from the second metal complex.

In some embodiments, the methods include providing a first metal complex and a second metal complex in a liquid, wherein the first metal complex and the second metal complex include a first ligand functionalized with an electron donor group; and exposing the liquid to light including one or more wavelengths sufficient to facilitate (i) the formation of an excited state on the first metal complex, (ii) an excited state electron transfer from the electron donor group of the first metal complex, and (iii) an irreversible chemical reaction of the electron donor group of the first metal complex, wherein the irreversible chemical reaction converts the first ligand of the first metal complex to a second ligand to form a modified first metal complex. The methods, in some embodiments, also include oxidizing the modified first metal complex. The modified first metal complex also may be separated from the second metal complex.

DETAILED DESCRIPTION

In some embodiments, methods of photochemical separation are provided, which rely on a chemical transformation of a coordinating ligand, rather than a metal ion.

In some embodiments, a ligand functionalized with an electroactive moiety is bound to metal atoms in a liquid, and, upon wavelength selective excitation of one of the coordination complexes, photoinduced electron transfer to/from the redox active group causes an irreversible reaction that chemically transforms the ligand, and the differences in at least one of solubility, size, reactivity, etc. between the initial and reacted complexes can be used, at least in part, to facilitate separation.

The electroactive moiety, in some embodiments, is an electron acceptor group. In some embodiments, the one or more wavelengths of light (i) cause an excited state electron transfer to the electron acceptor group of the first metal complex, and (ii) do not cause an excited state electron transfer to the electron acceptor group of the second metal complex in more than 10 wt %, more than 8 wt %, more than 6 wt %, more than 5 wt %, more than 2 wt %, more than 1 wt %, or more than 0.1 wt % of the second metal complex (based on the total weight of the second metal complex).

The electroactive moiety, in some embodiments, is an electron donor group. In some embodiments, the one or more wavelengths of light (i) cause an excited state electron transfer from the electron donor group of the first metal complex, and (ii) do not cause an excited state electron transfer from the electron donor group of the second metal complex in more than 10 wt %, more than 8 wt %, more than 6 wt %, more than 5 wt %, more than 2 wt %, more than 1 wt %, or more than 0.1 wt % of the second metal complex (based on the total weight of the second metal complex).

Figure 1:
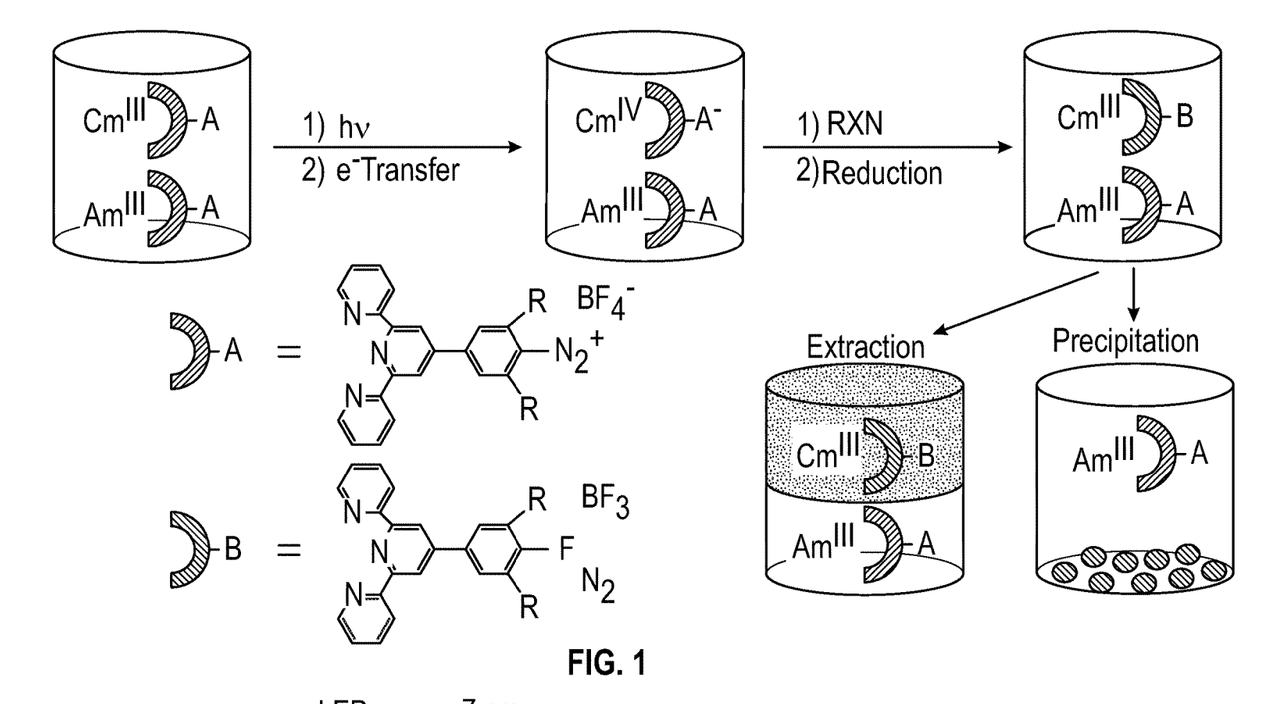
FIG. 1 depicts a schematic of an embodiment of a method described herein.

One embodiment of the methods provided herein is depicted at FIG. 1. FIG. 1 depicts a photo-driven chemical separation scheme of a Cm(III) complex and an Am(III) complex.

In the embodiment depicted at FIG. 1, a ligand functionalized with an electron acceptor group (A), is coordinated to both Cm(III) and Am(III) to form a first metal complex and a second metal complex, respectively. Selective excitation of Cm(III) is followed by excited state electron transfer to the acceptor moiety (A), which then undergoes an irreversible chemical reaction to generate a new ligand functional group (B), thereby forming a modified first metal complex. The Cm(IV) is then reduced back to Cm(III) by the liquid, a weak reducing agent, or a combination thereof. In the embodiment depicted at FIG. 1, the structural change in the ligand influences the solubility of the photoreacted Cm(III) complex, which can then be separated by extraction or precipitation from the starting mixture, or chromatography may be used.

Metal Complexes

The metal complexes herein may include a metal atom and a ligand coordinated to the metal atom, wherein the ligand is functionalized with an electroactive moiety. A metal atom may be coordinated with one ligand, or more than one ligand. When more than one ligand is coordinated with a metal atom, the ligands may have the same structure, or the ligands may have different structures. When more than one ligand is coordinated with a metal atom, at least one ligand coordinated with a metal atom may be functionalized with an electroactive moiety, which may include an electron donor group or an electron acceptor group.

The phrases "first ligand" and "second ligand" are used herein to distinguish the structure of a ligand before and after the "irreversible chemical reactions" described herein, which convert a first ligand of a first metal complex to a second ligand to form a modified first metal complex.

In some embodiments, the first ligand of the metal complexes provided herein includes acetylacetone (acac), dipicolinic acid (DPA), terpyridine (Tpy), diethylenetriaminepentaacetic acid (DTPA), or a combination thereof, which has been functionalized with an electroactive moiety selected from an electron donor group or an electron acceptor group. Other first ligands are envisioned, however, and any known species that is capable of (i) coordinating with a metal atom and (ii) being functionalized with an electroactive moiety can be used as a first ligand.

In some embodiments, the first ligand is functionalized with an electron acceptor group. The electron acceptor group, in some embodiments, includes a diazonium moiety.

The diazonium moiety may be covalently bonded to an unsubstituted or substituted aryl moiety of the ligand. In one embodiment, the electron acceptor group has the following structure:

wherein each R is independently selected from hydrogen, C$_1$-C$_{20}$ hydrocarbyl, NO$_2$, CN, or one or more other functional groups that do not substantially undermine the methods described herein. The electron acceptor group may include any suitable anion, such as BF$_4^-$ or PF$_6^-$. Non-limiting examples of other moieties that may be used as (i) an electron acceptor group, or (ii) part of an electron acceptor group a hydrazide, a hydrazine, a benzylhalide, an Se-phenyl arylselenosulfonate, a phenacyl halide, or a combination thereof.

In some embodiments, the first ligand is functionalized with an electron donor group. The electron donor group, in some embodiments, includes an amine moiety. The electron donor group, in some embodiments, includes one or more of the following: an alkylamine, an arylamine, an ethanolamine, or combination thereof.

In some embodiments, the first metal complex is a Cm(III) complex, and the second metal complex is an Am(III) complex.

In some embodiments, the first metal complex is an Am(III) complex, and the second metal complex is a Cm(III) complex.

In some embodiments, the first metal complex and the second metal complex independently comprise a lanthanide or an actinide. For example, the first metal complex may be a first lanthanide, and the second metal complex may be a second lanthanide or an actinide. As a further example, the first metal complex may be a first actinide, and the second metal complex may be a second actinide or a lanthanide.

In some embodiments, the first metal complex is Nd(trp-ph-N$_2$)(NO$_3$)$_3$(BF$_4$), and the second metal complex is Eu(trp-ph-N$_2$)$_3$(NO$_3$)$_3$(BF$_4$)$_3$. In some embodiments, the first metal complex is Eu(trp-ph-N$_2$)$_3$(NO$_3$)$_3$(BF$_4$)$_3$, and the second metal complex is Nd(trp-ph-N$_2$)(NO$_3$)$_3$(BF$_4$).

In some embodiments, the first metal complex is an Ru(II) complex, and the second metal complex is an Fe(II) complex.

In some embodiments, the first metal complex is an Fe(II) complex, and the second metal complex is an Ru(II) complex.

In some embodiments, the first metal complex is Ru(tpy-Ph-N$_2^+$)$_2$(PF$_6$)$_4$, and the second metal complex is Fe(tpy-Ph-N$_2^+$)$_2$(PF$_6$)$_4$.

In some embodiments, the first metal complex is Fe(tpy-Ph-N$_2^+$)$_2$(PF$_6$)$_4$, and the second metal complex is Ru(tpy-Ph-N$_2^+$)$_2$(PF$_6$)$_4$.

Liquid

Any liquid that is (i) compatible with the first metal complex, (ii) compatible with the second metal complex, (iii) does not undesirably impact one or more of the steps described herein, or (iv) a combination thereof may be used in the methods provided herein.

The liquid may include one type of liquid (e.g., acetonitrile) or two or more types of liquid (e.g., acetonitrile and acetone).

In some embodiments, the first metal complex, the second metal complex, or a combination thereof are at least partially soluble in the liquid. In some embodiments, the first metal complex and the second metal complex are soluble in the liquid. In some embodiments, the modified first metal complex has a solubility in the liquid that is less than the solubility of at least one of the first metal complex or the second metal complex in the liquid.

In some embodiments, the liquid is acetonitrile, acetone, methanol, or a combination thereof.

Light

Any light source may be used to apply light to a liquid. The light may include a single wavelength or a plurality of wavelengths.

In some embodiments, the one or more wavelengths of light are selected to excite only the first metal complex, while leaving the second metal complex substantially unperturbed, as described herein.

Reducing/Oxidizing

In some embodiments, the reducing or oxidizing of a modified first metal complex includes contacting the modified first metal complex with a reducing agent or an oxidizing agent, respectively.

In some embodiments, the reducing or oxidizing of the modified first metal complex is achieved by the liquid.

In some embodiments, a reducing agent or oxidizing agent may be used in addition to relying on the reducing or oxidizing ability, respectively, of the liquid. Non-limiting examples of reducing agents include trialkylamine, triethanolamine, dimethylacetamide (DMA), N,N-dimethyltryptamine (DMT), benzyldihydronicotinamide (BNAH), bismuth hydride (BIH), ascorbic acid, oxalate, PPh$_3$, hydroquinone, iodide, or a combination thereof. Non-limiting examples of oxidizing agents include quinone, ceric ammonium nitrate, tetracyanoquinodimethane (TCNQ), Cl$_2$, F$_2$, or a combination thereof Separating The separating of the modified first metal complex from the second metal complex may include relying on any difference between the modified first metal complex and the second metal complex. Non-limiting examples of possible differences between the modified first metal complex and the second metal complex include differences in solubility, size, reactivity, or a combination thereof. One or more of these differences may be relied upon to separate the modified first metal complex from the second metal complex.

In some embodiments, the separating of the modified first metal complex from the second metal complex includes precipitating the modified first metal complex, extracting the first metal complex, subjecting the materials to chromatography, or a combination thereof. The modified first metal complex may precipitate, with or without assistance, upon formation. Any known precipitation and/or extraction techniques may be used to facilitate the separation. In one embodiment, the solubility of the modified first metal complex in the liquid is lower than the solubility of the first metal complex in the liquid. This difference in solubility may assist the separation of the first metal complex from the second metal complex.

In some embodiments, the methods provided herein include providing a Cm(III) complex and an Am(III) complex in a liquid, wherein the Cm(III) complex and the Am(III) complex include a first ligand functionalized with an electron acceptor group; and exposing the liquid to light having one or more wavelengths sufficient to selectively facilitate (i) an excited state electron transfer to the electron acceptor group of the Cm(III) complex to form a Cm(IV) complex, and (ii) an irreversible chemical reaction of the electron acceptor group of the Cm(IV) complex, wherein the irreversible chemical reaction converts the first ligand of the Cm(IV) complex to a second ligand to form a modified Cm(IV) complex. In some embodiments, the methods also include reducing the modified Cm(IV) complex to a modified Cm(III) complex. In some embodiments, the methods include separating the modified Cm(IV) complex or the reduced modified Cm(III) complex from the second metal complex.

In embodiments, the methods provided herein include providing a Cm(III) complex and an Am(III) complex in a liquid, wherein the Cm(III) complex and the Am(III) complex include a first ligand functionalized with an electron donor group; and exposing the liquid to light having one or more wavelengths sufficient to selectively facilitate (i) the formation of an excited state on the Cm(III) complex, (ii) an excited state electron transfer from the electron donor group of the Cm(III) complex to form a Cm(II) complex, and (iii) an irreversible chemical reaction of the electron donor group of the Cm(II) complex, wherein the irreversible chemical reaction converts the first ligand of the Cm(II) complex to a second ligand to form a modified Cm(II) complex. In some embodiments, the methods include oxidizing the modified Cm(II) complex to a modified Cm(III) complex. In some embodiments, the methods include separating the modified Cm(II) complex or the oxidized modified Cm(III) complex from the second metal complex.

The phrases "$C_1$-$C_{20}$ hydrocarbyl" and the like, as used herein, generally refer to aliphatic, aryl, or arylalkyl groups containing 1 to 20 carbon atoms. Examples of aliphatic groups, in each instance, include, but are not limited to, an alkyl group, a cycloalkyl group, an alkenyl group, a cycloalkenyl group, an alkynyl group, an alkadienyl group, a cyclic group, and the like, and includes all substituted, unsubstituted, branched, and linear analogs or derivatives thereof, in each instance having 1 to about 20 carbon atoms. Examples of alkyl groups include, but are not limited to, methyl, ethyl, propyl, isopropyl, n-butyl, t-butyl, isobutyl, pentyl, hexyl, isohexyl, heptyl, 4,4-dimethylpentyl, octyl, 2,2,4-trimethylpentyl, nonyl, decyl, undecyl and dodecyl. Cycloalkyl moieties may be monocyclic or multicyclic, and examples include cyclopropyl, cyclobutyl, cyclopentyl, cyclohexyl, and adamantyl. Additional examples of alkyl moieties have linear, branched and/or cyclic portions (e.g., 1-ethyl-4-methyl-cyclohexyl). Representative alkenyl moieties include vinyl, allyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, 1-hexenyl, 2-hexenyl, 3-hexenyl, 1-heptenyl, 2-heptenyl, 3-heptenyl, 1-octenyl, 2-octenyl, 3-octenyl, 1-nonenyl, 2-nonenyl, 3-nonenyl, 1-decenyl, 2-decenyl and 3-decenyl. Representative alkynyl moieties include acetylenyl, propynyl, 1-butynyl, 2-butynyl, 1-pentynyl, 2-pentynyl, 3-methyl-1-butynyl, 4-pentynyl, 1-hexynyl, 2-hexynyl, 5-hexynyl, 1-heptynyl, 2-heptynyl, 6-heptynyl, 1-octynyl, 2-octynyl, 7-octynyl, 1-nonynyl, 2-nonynyl, 8-nonynyl, 1-decynyl, 2-decynyl and 9-decynyl. Examples of aryl or arylalkyl moieties include, but are not limited to, anthracenyl, azulenyl, biphenyl, fluorenyl, indan, indenyl, naphthyl, phenanthrenyl, phenyl, 1,2,3,4-tetrahydro-naphthalene, tolyl, xylyl, mesityl, benzyl, and the like, including any heteroatom substituted derivative thereof.

Unless otherwise indicated, the term "substituted," when used to describe a chemical structure or moiety, refers to a derivative of that structure or moiety wherein one or more of its hydrogen atoms is substituted with a chemical moiety or functional group such as alcohol, alkoxy, alkanoyloxy, alkoxycarbonyl, alkenyl, alkyl (e.g., methyl, ethyl, propyl, t-butyl), alkynyl, alkylcarbonyloxy (—OC(O)alkyl), amide (—C(O)NH-alkyl- or -alkylNHC(O)alkyl), tertiary amine (such as alkylamino, arylamino, arylalkylamino), aryl, aryloxy, azo, carbamoyl (—NHC(O)O-alkyl- or —OC(O)NH-alkyl), carbamyl (e.g., $CONH_2$, as well as CONH-alkyl, CONH-aryl, and CONH-arylalkyl), carboxyl, carboxylic acid, cyano, ester, ether (e.g., methoxy, ethoxy), halo, haloalkyl (e.g., —$CCl_3$, —$CF_3$, —$C(CF_3)_3$), heteroalkyl, isocyanate, isothiocyanate, nitrile, nitro, phosphodiester, sulfide, sulfonamido (e.g., $SO_2NH_2$), sulfone, sulfonyl (including alkylsulfonyl, arylsulfonyl and arylalkylsulfonyl), sulfoxide, thiol (e.g., sulfhydryl, thioether) or urea (—NHCONH-alkyl-).

It must be noted that, as used in the specification and the appended claims, the singular forms "a," "an," and "the" include plural referents unless the context clearly dictates otherwise. Thus, for example, reference to "a first metal complex" includes mixtures of first metal complexes, and the like.

In the descriptions provided herein, the terms "includes," "is," "containing," "having," and "comprises" are used in an open-ended fashion, and thus should be interpreted to mean "including, but not limited to." When methods or systems are claimed or described in terms of "comprising" various components or steps, the methods or systems can also "consist essentially of" or "consist of" the various components or steps, unless stated otherwise.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example 1—Excitation and Reaction of Electron Acceptor Groups

Figure 2:
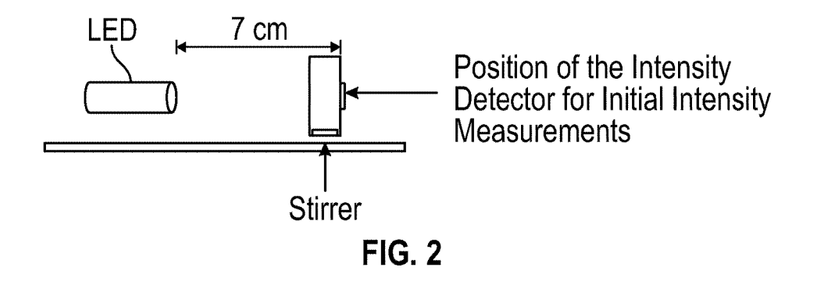
FIG. 2 depicts a schematic of an embodiment of an experimental setup that may be used for embodiments of methods described herein.
Figure 3:
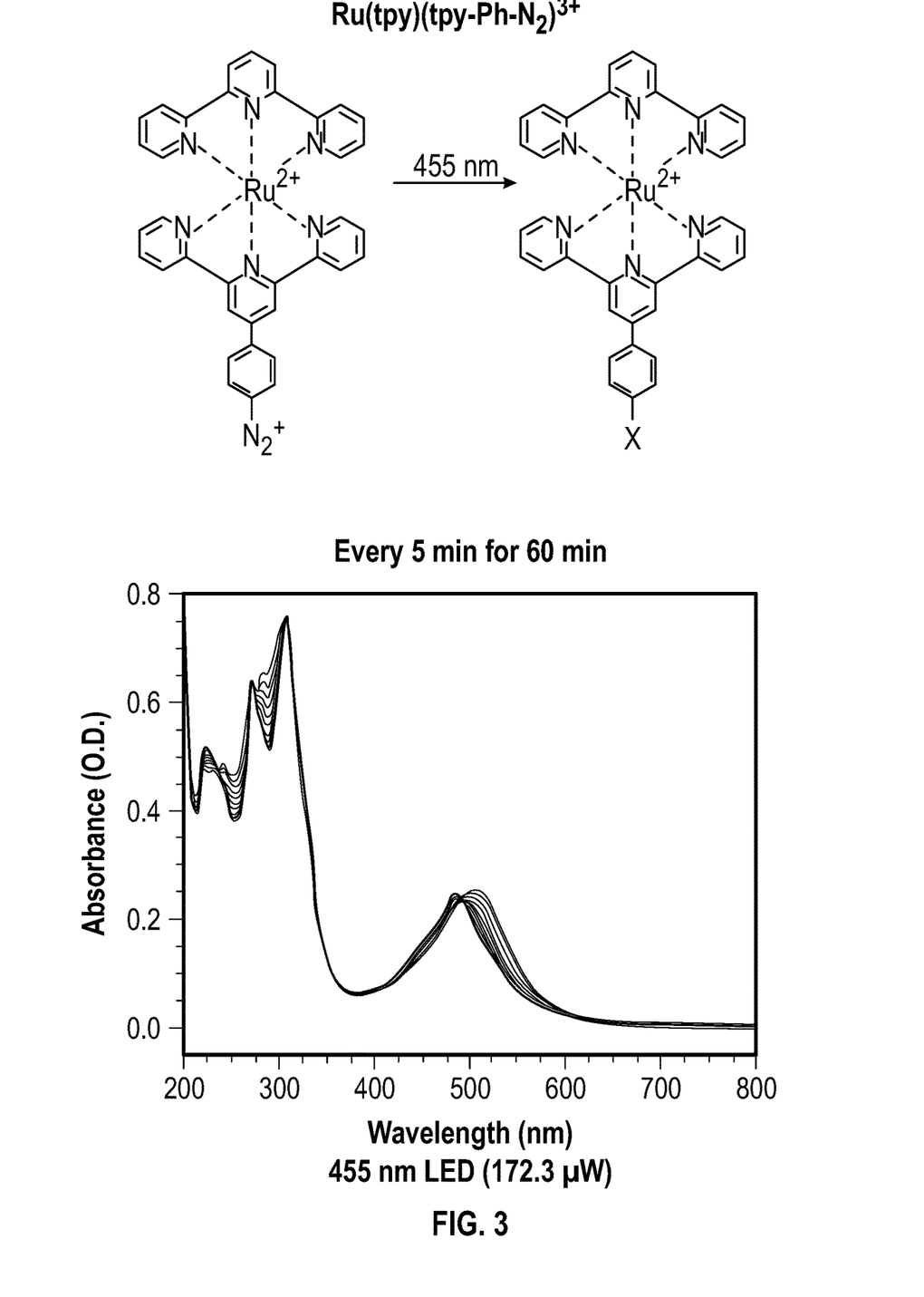
FIG. 3 depicts a structure of $Ru(tpy)(tpy-Ph-N_2)^{3+}$ before and after exposure to light, and a corresponding plot of absorbance v. wavelength.
Figure 4:
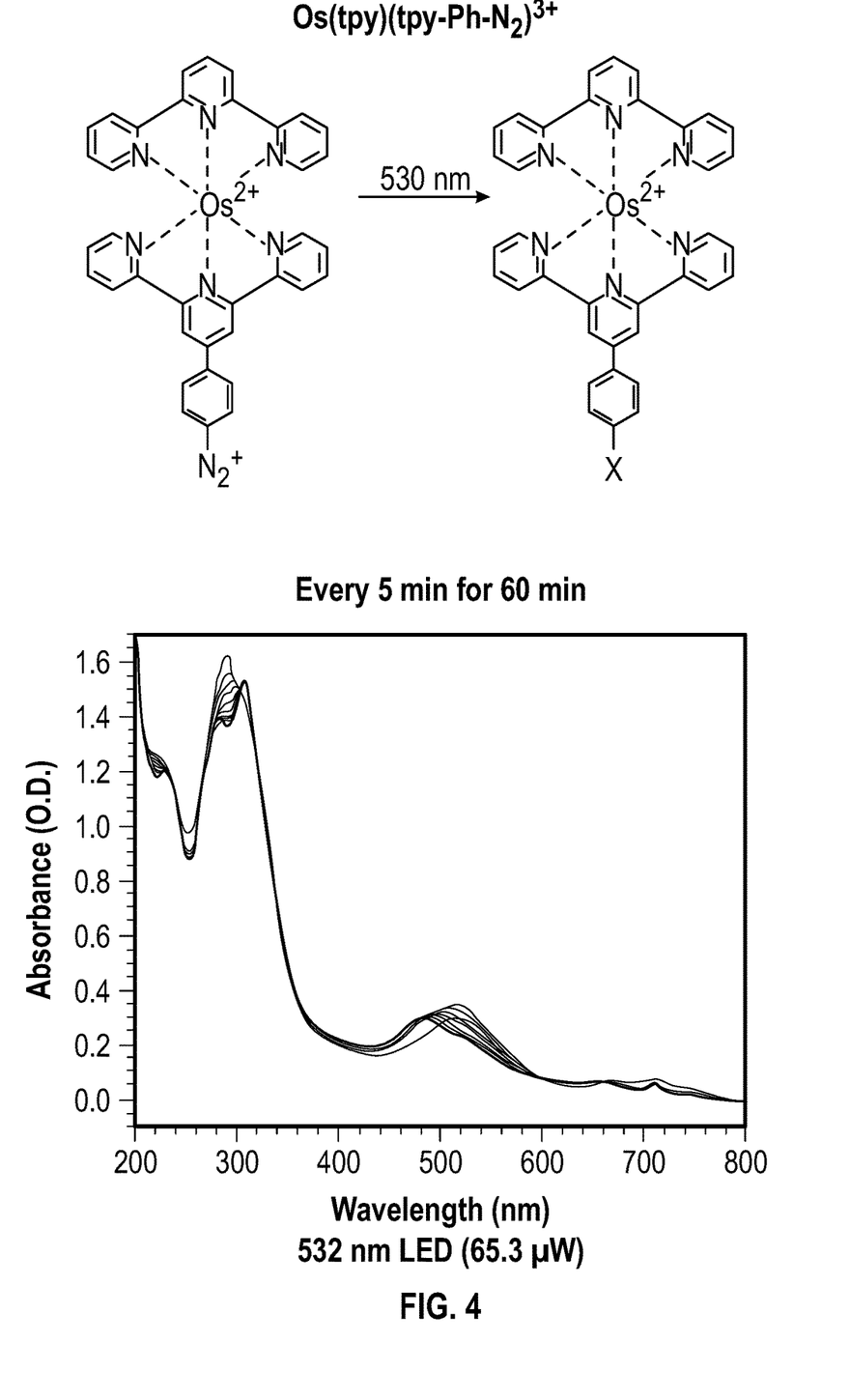
FIG. 4 depicts a structure of Os(tpy)(tpy-Ph-N$_2$)$^{3+}$ before and after exposure to light, and a corresponding plot of absorbance v. wavelength.
Figure 5:
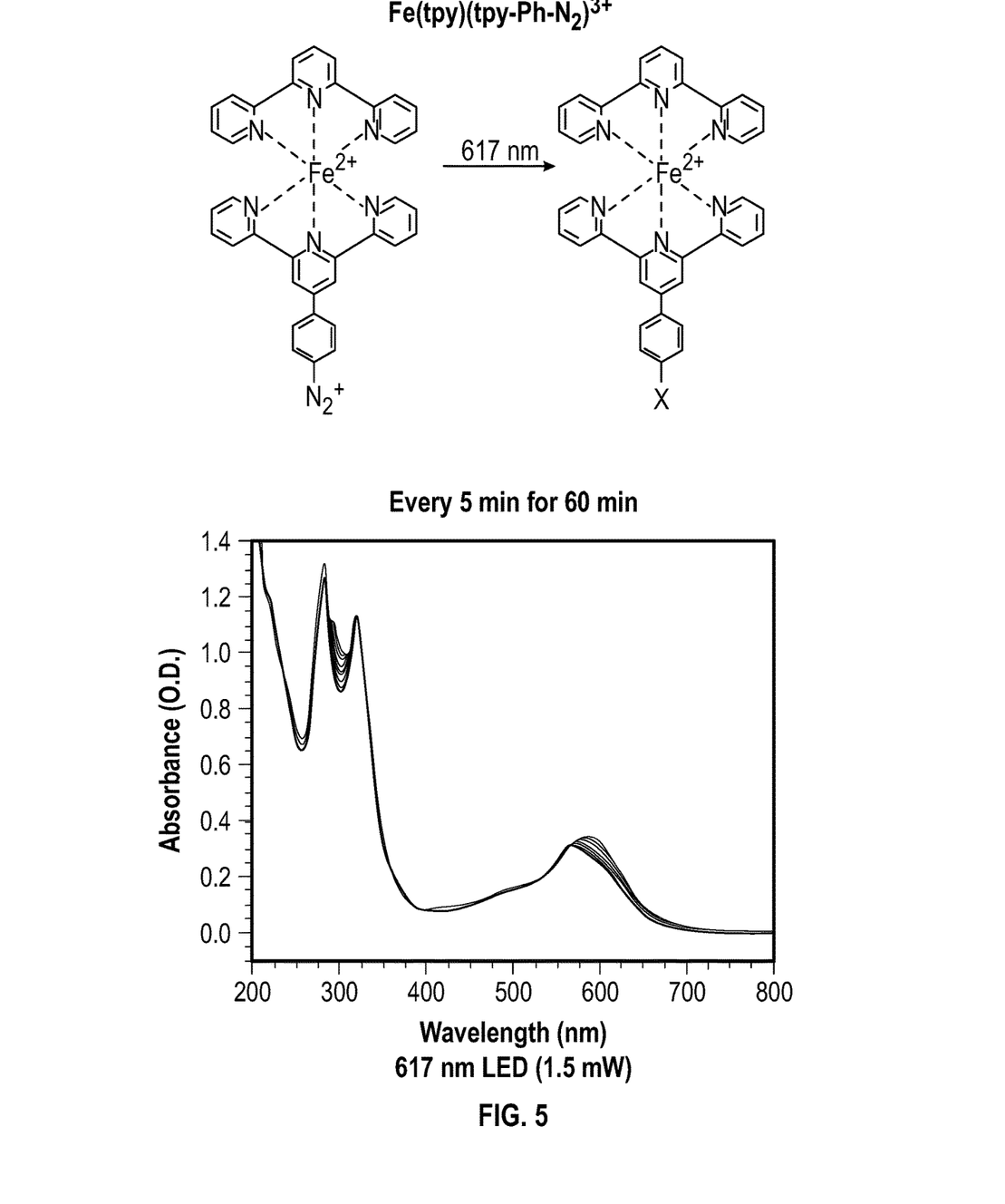
FIG. 5 depicts a structure of Fe(tpy)(tpy-Ph-N$_2$)$^{3+}$ before and after exposure to light, and a corresponding plot of absorbance v. wavelength.
Figure 6:
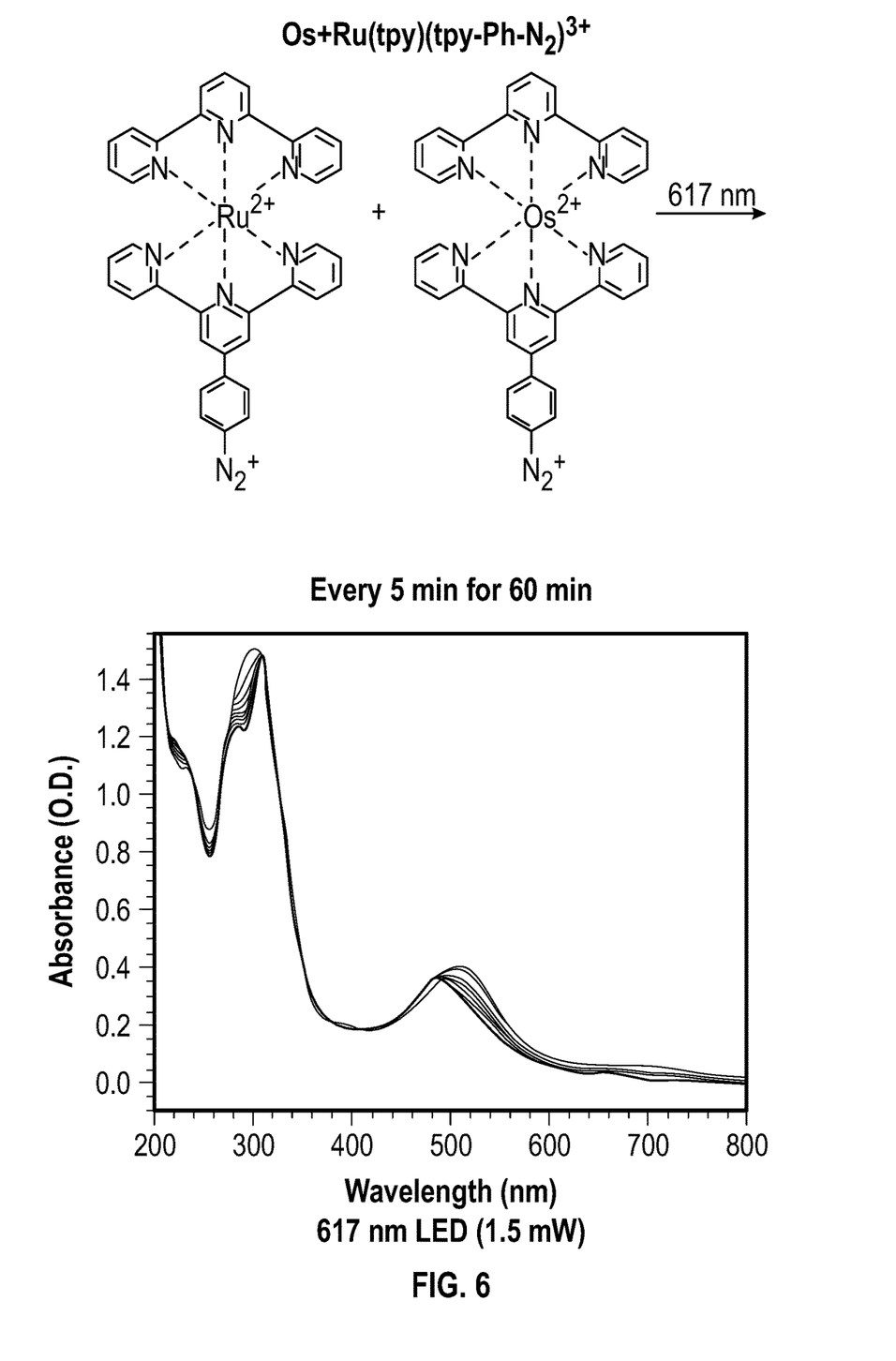
FIG. 6 depicts a structure of Os+Ru(tpy)(tpy-Ph-N$_2$)$^{3+}$ before and after exposure to light, and a corresponding plot of absorbance v. wavelength.

All experiments of this example were conducted in dry deareated ($N_2$) $CH_3CN$ at room temperature. FIG. 2 is a schematic of the apparatus used in this example.

In this example, the complexes depicted in the following figures were tested, which included Ru(tpy)(tpy-Ph-$N_2$)$^{3+}$, Os(tpy)(tpy-Ph-$N_2$)$^{3+}$, and Fe(tpy)(tpy-Ph-$N_2$)$^{3+}$. The structures of these complexes, along with the results achieved in this example, are depicted at FIG. 3, FIG. 4, FIG. 5, and FIG. 6.

Figure 7:
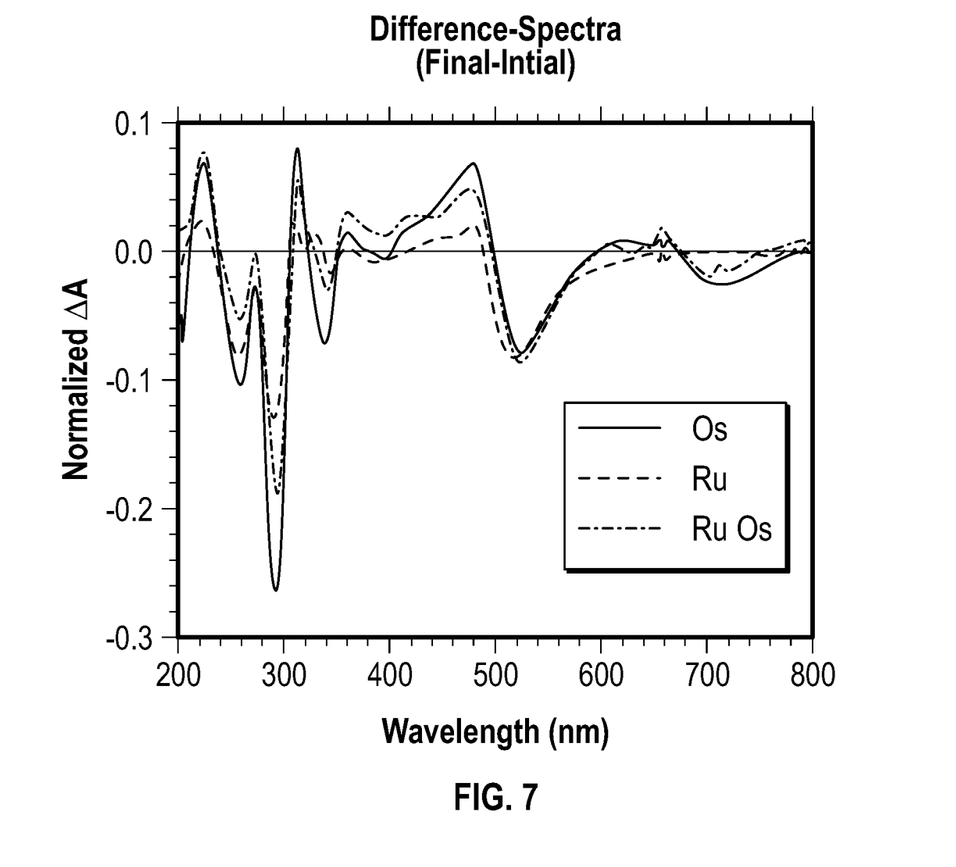
FIG. 7 depicts a plot of normalized change in absorbance v. wavelength for Ru(tpy)(tpy-Ph-N$_2$)$^{3+}$, Os(tpy)(tpy-Ph-N$_2$)$^{3+}$, and a mixture thereof.

FIG. 7 depicts a comparison of the spectral changes for Ru(tpy)(tpy-Ph-$N_2$)$^{3+}$, Os(tpy)(tpy-Ph-$N_2$)$^{3+}$, and a mixture thereof.

Example 2—Synthesis of Nd and Eu Complexes

Nd and Eu complexes were prepared for use in the methods described herein. The methods of this example may be applied to other complexes, where appropriate. The Nd and Eu complexes of this examples were prepared according to the following scheme:

The Nd and Eu complexes may be separated according to the methods described herein.

Example 3—Terpyridine Functionalized with a Benzenediazonium Group

In this example, a diazonium functionalized terpyridine ligand was coordinated to both $Ru^{2+}$ and $Fe^{2+}$ ions. Upon excitation, the diazonium ligand, as explained below, was irreversibly reduced via a single electron transfer resulting in the loss of $N_2$, and the concomitant generation of an aryl radical, which then abstracted H from the liquid. For a mixture of metal ions, excitation at 455 nm and 700 nm resulted in a wavelength selective photoreaction of the ruthenium and iron complexes, respectively, while the other species remained largely unperturbed. Due to the large difference in charge, the product (+2) could readily be separated from the starting material (+4) using thin layer chromatography.

Terpyridine functionalized with a benzenediazonium group (tpy-Ph-$N_2^+$) was used as an electroactive ligand in this example.

Figure 8:
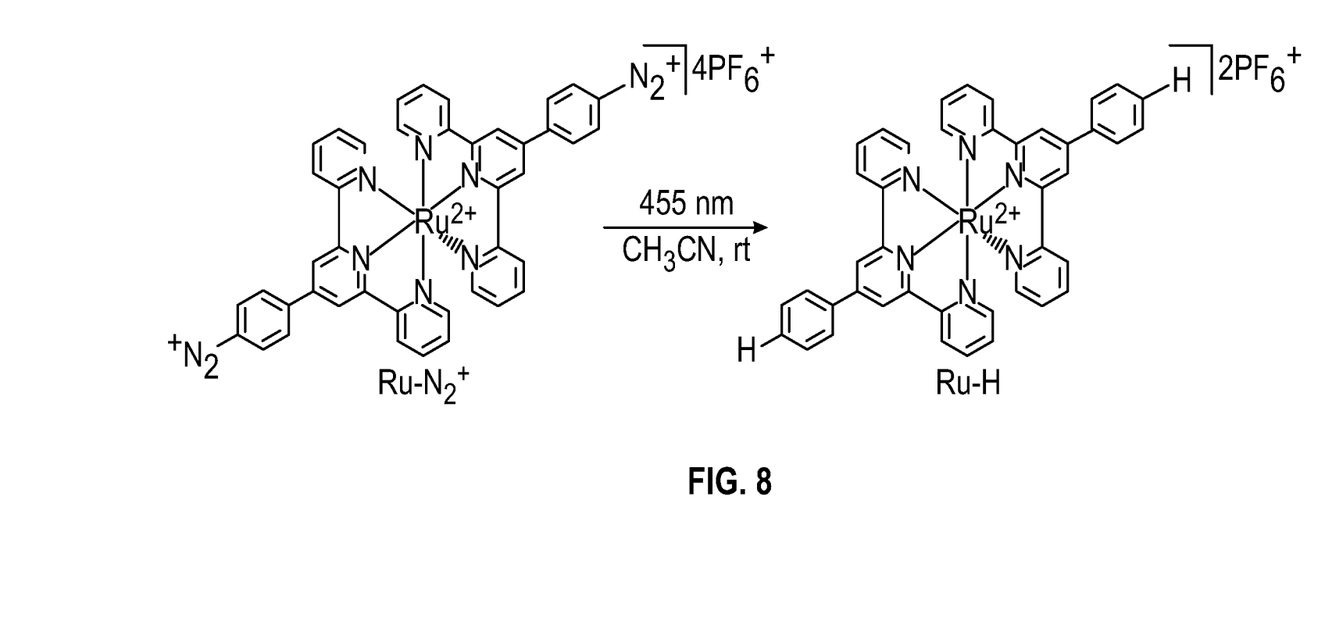
FIG. 8 depicts an embodiment of a metal complex, and an embodiment of a photoreaction.

The structure and photoreaction of Ru(tpy-Ph-$N_2^+$)$_2$ (PF$_6$)$_4$)(Ru—$N_2^+$) is depicted at FIG. 8. The diazonium groups of this example, as depicted at FIG. 8, were irreversibly reduced.

The metal ion of interest, ruthenium(II), was selected for this example due, at least in part, to its well-understood photophysical properties, reversible single electron oxidation, and established coordination chemistry with tpy ligands.

The Ru(tpy-Ph-$N_2^+$)$_2$(PF$_6$)$_4$ complex (Ru—$N_2^+$) was synthesized according to the following procedure. The amine substituted ligand (typ-Ph-NH$_2$) was reacted with RuCl$_3$ in ethanol to generate Ru(tpy-Ph-NH$_2$)$_2$(PH$_6$)$_2$.

The complex was then oxidized with NaNO$_2$ and precipitated with KPF$_6$, which yielded Ru—$N_2^+$ as indicated by NMR and IR spectroscopy. The UV-vis absorption spectrum of Ru—$N_2^+$ had strong p-p* transitions below 350 nm and a lower energy metal-to-ligand charge-transfer (MLCT) transition from 400-600 nm that are characteristic for Ru(tpy)$_2^+$ complexes.

Figure 9:
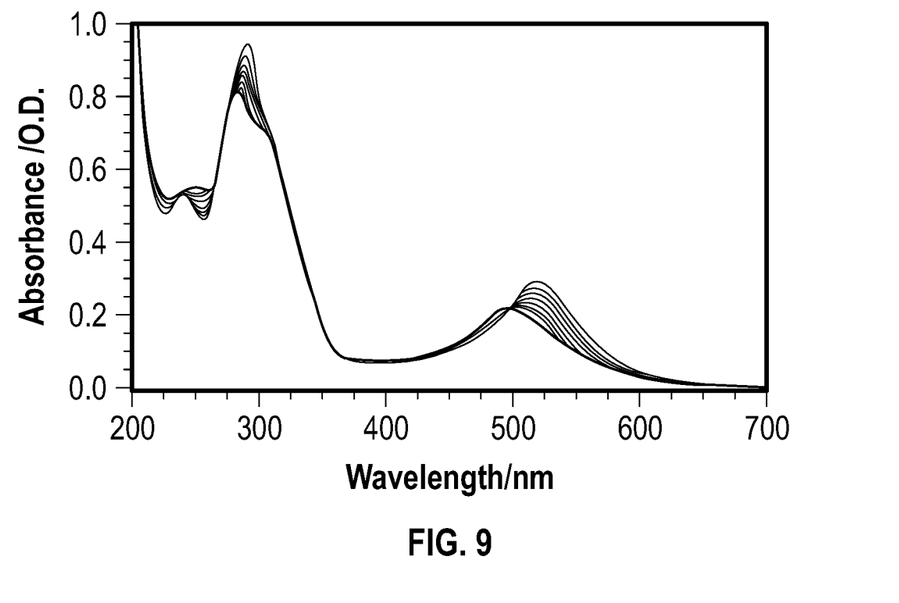
FIG. 9 depicts changes in an absorption spectra for Ru—N$_2^+$ in MeCN upon irradiation with 455 nm light.
Figure 10:
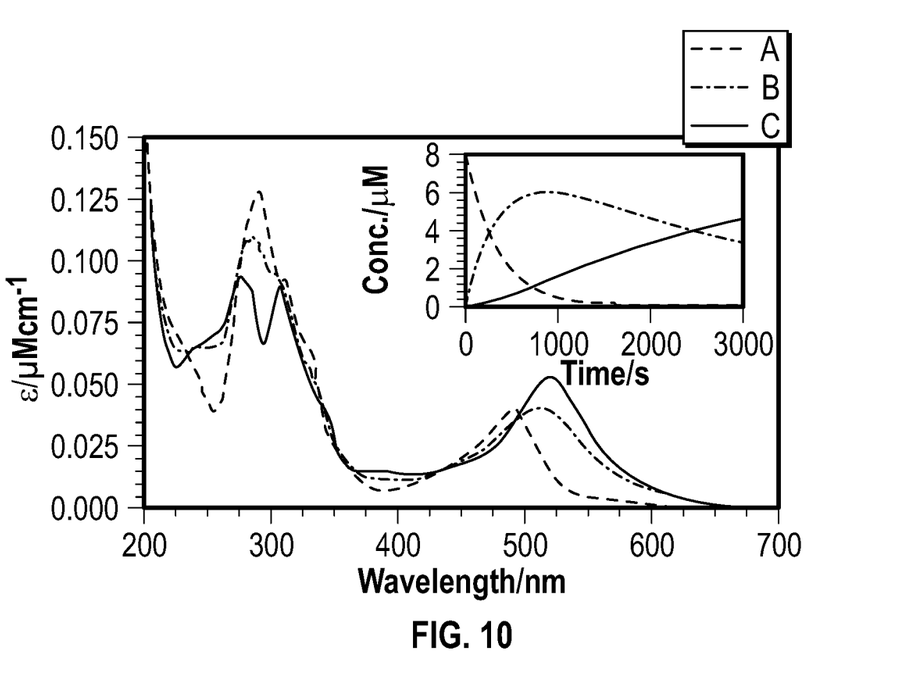
FIG. 10 depicts absorption spectra and molar extinction coefficients for embodiments of species from a spectral fitting.

FIG. 9 depicts the changes in the absorption spectra for Ru—$N_2^+$ in MeCN upon irradiation with 455 nm light (100 mW)(0 minutes to 60 minutes, every 5 minutes). FIG. 10 depicts the absorption spectra and molar extinction coefficients for species A, B, and C from spectral fitting (inset: changes in the relative concentration of A, B, and C).

Ru—$N_2^+$ in a deaerated solution of MeCN (8 mM) was then irradiated with 455 nm light (100 mW), and the spectral changes were monitored by UV-vis spectroscopy (FIG. 9). The experiments were performed at 4° C. to limit any competitive thermal decomposition of the diazonium functional group. As depicted at FIG. 9, upon irradiation of Ru—$N_2^+$, there were changes throughout the entire spectrum, with notable shifts in the π-π* and MLCT peak maximum from 290 nm to 285 nm and 520 nm to 494 nm, respectively.

The spectral changes were satisfactorily fitted with the SPECFIT/32 global analysis software package using a model with two consecutive first order reactions, A-B-C. The absorption spectra and extinction coefficients for all three species (FIG. 10) were consistent with Ru(tpy)$_2^{2+}$ complexes with the spectra for A and C closely matching Ru—$N_2^+$, and the photoproduct depicted at FIG. 8.

The two step process as well as the gradual blue shift in absorption were consistent with the sequential loss of the strongly electron withdrawing diazonium moieties in the order Ru(tpy-Ph-$N_2^+$)$_2$ to Ru(tpy-Ph-$N_2^+$)(tpy-Ph-H) to Ru(tpy-Ph-H)$_2$.

The rate constant for the first step ($k_{A-B}$=15.4×10$^4$ s$^1$) was more than seven times faster than the second step ($k_{B-C}$=2.0×10$^4$ S$^1$). While the reaction was fundamentally the same, the slowed kinetics for the second step were at least in part due to filtering effects by the starting material and product, which competitively absorbed photons and slowed down the reaction kinetics for B-C.

In an effort to identify the reaction product, an 8 mM solution of Ru—$N_2^+$ was irradiated with 455 nm light, while the reaction progress was monitored by thin layer chromatography. After 2 hours, the crude mixture was purified by silica gel column chromatography. NMR and mass spectroscopy analysis of the product were all consistent with the formation of the product, Ru(tpy-Ph-H)$_2$(PF$_6$)$_2$, in which the diazonium group was replaced by a hydrogen atom, as depicted at FIG. 8.

Figure 11:
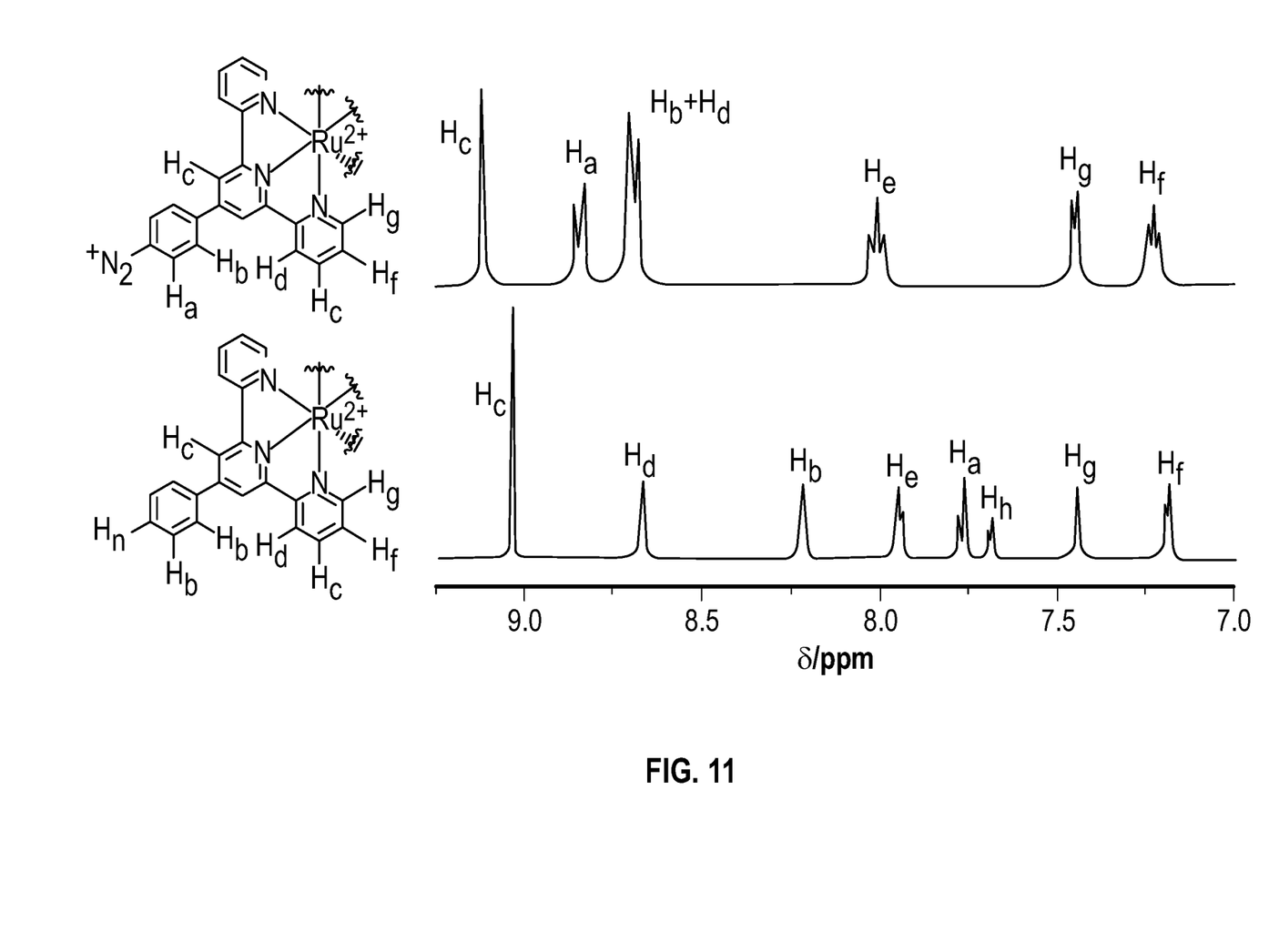
FIG. 11 depicts $^1$H NMR spectra and peak assignments of Ru—N$_2^+$ in deuterated acetonitrile before (top) and after (bottom) irradiation with 455 nm light.

FIG. 11 depicts a comparison of the $^1$H NMR spectra of Ru—$N_2^+$ before and after irradiation. The $^1$H NMR of the isolated photoproduct exhibited significant shifts in the ortho and meta protons of the phenyl group as well as an additional peak at 7.69 ppm that were not present in the starting material.

The spectrum of the product was consistent with the formation of Ru(tpy-Ph-H)$_2$(PF$_6$)$_2$, which was consistent with the irreversible reduction of diazonium via single electron transfer, the loss of $N_2$, and the concomitant generation of an aryl radical, which was believed to abstract H from the liquid. It should be noted that an aryl radical can be trapped by a radical scavenger, which may provide an additional tool for tuning the solubility difference between reactants and products.

Also generated was the iron containing complex, Fe(tpy-Ph-$N_2^+$)$_2$(PF$_6$)$_4$(Fe—$N_2^+$), by a similar procedure to that described above for ruthenium.

Upon exposure to 617 nm light (700 mW), Fe—$N_2^+$ underwent a similar photochemical reaction. The photoreaction for Fe—$N_2^+$ was notably slower than that for Ru—$N_2^+$, even at higher excitation intensities. Despite Ru—$N_2^+$ being excited with higher energy light ($l_{ex}$=455 nm) than Fe—$N_2^+$ ($l_{ex}$=700 nm), the decrease in reactivity could not be attributed to the difference in the driving force for electron transfer because the excited state oxidation potential ($E_{1/2}$*), calculated using the Rehm-Weller formalism, was more negative for Fe(tpy)$_2^{2+}$ ($E_{1/2}$*=1.2 V vs. SCE) than for Ru(tpy)$_2^{2+}$ ($E_{1/2}$*=1.1 V vs. SCE). Instead, the decreased reactivity of Fe—$N_2^+$ was presumably due to the significantly shorter excited state lifetime of the Fe(tpy)$_2^{2+}$ complexes, which can result in non-radiative relaxation prior to electron transfer.

Figure 12:
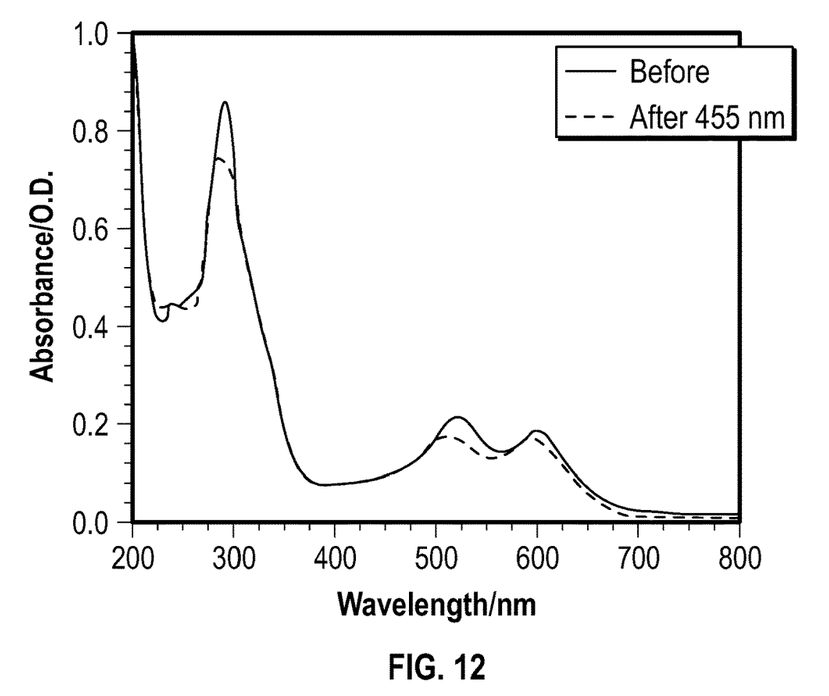
FIG. 12 depicts the changes of an absorption spectra observed when an embodiment of a mixture was irradiated with 455 nm light.
Figure 13:
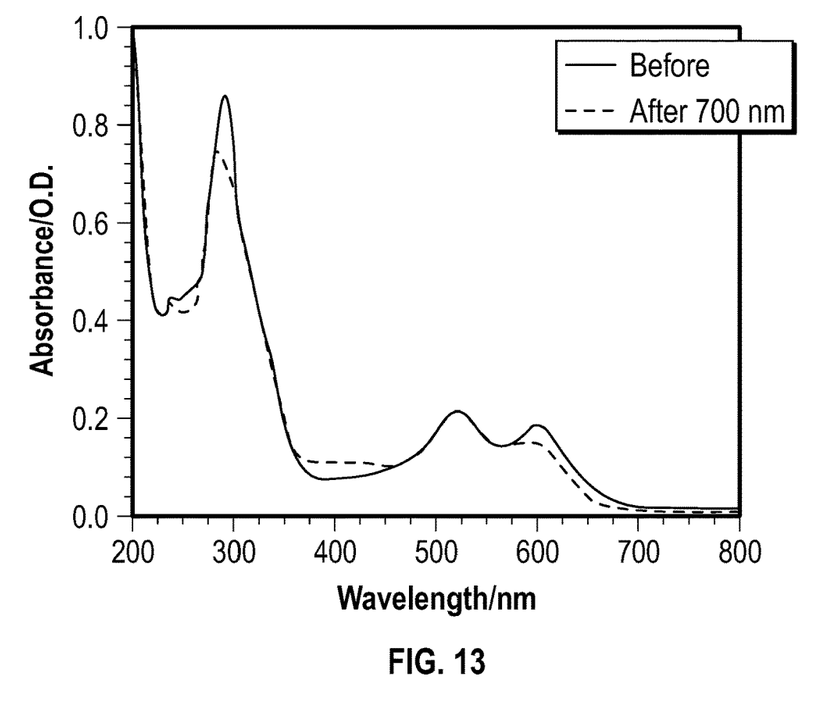
FIG. 13 depicts the changes of an absorption spectra observed when an embodiment of a mixture was irradiated with 700 nm light.

Solutions containing a one-to-one mixture of Ru—$N_2^+$ and Fe—$N_2^+$ in deaerated MeCN were irradiated with 455 nm and 700 nm light, and the results are depicted, respectively, at FIG. 12 and FIG. 13. FIG. 12 depicts the changes in the absorption spectra for a one-to-one mixture of Ru—$N_2^+$ and Fe—$N_2^+$ in MeCN upon irradiation with 455 nm light (100 mW) at 4° C. for 30 minutes. FIG. 13 depicts the changes in the absorption spectra for a one-to-one mixture of Ru—$N_2^+$ and Fe—$N_2^+$ in MeCN upon irradiation with 700 nm light (0.5 mJ per pulse at 10 Hz) at 0° C. for 4 hours.

The starting mixture had low energy absorption peaks at 520 nm and 600 nm from the MLCT transitions of Ru—$N_2^+$ and Fe—$N_2^+$, respectively. Under 455 nm irradiation, with preferential excitation into the ruthenium complex, there were notable spectral shifts to the 520 nm peak but minimal changes at 600 nm.

The latter changes coincided with the rate of thermal decomposition of the Fe—$N_2^+$ complex. Conversely, under 700 nm light, with selective excitation of the Fe complex MLCT bands, the spectral changes were primarily due to a photoreaction of the Fe—$N_2^+$ complex at 600 nm with the 520 nm peak for the Ru—$N_2^+$ complex largely unaffected (FIG. 13).

The photoproducts of this example were readily separated from the starting material using chromatography, eluting with a mixture of CH$_3$CN, water and saturated KNO$_3$(aq.). Fe—$N_2^+$, Ru—$N_2^+$, and the mixed solution prior to irradiation had limited mobility on silica gel, possibly due to their +4 charge. After irradiation of Fe—$N_2^+$ and Ru—$N_2^+$ with 617 nm or 455 nm light, respectively, the less charged photoproducts exhibited much higher mobility, and readily eluted on silica gel with an $R_f$ value of 0.6.

The similar mobility of the iron and ruthenium photoproducts indicated that the solubility and the separation of these species in this example was dictated by the ligands and not the metal ions.

For the mixed solutions, excitation at 700 nm and 455 nm resulted in two distinct colored spots, one remained on the baseline and one had the same mobility as the photoproduct. The UV-vis spectra of the mobile fraction were in agreement with the photoreacted products of Fe—$N_2^+$ and Ru—$N_2^+$. A subtle spot at $R_f$=0.3 was observed in several of the samples. Given the reduced mobility relative to the product, this spot was presumably the partially reacted intermediate with only one of the two diazonium moieties cleaved.

This wavelength selective reactivity indicated that this was not a biomolecular process (i.e., there was not intermolecular electron transfer), but, instead, excitation, electron transfer, and the chemical reaction all occurred on a single complex and were rate limited by photon flux. This observation was critical for separations in that any intermolecular electron transfer would have negated the selectivity of the method of this example.

We claim:

1. A method of separation comprising:
providing a first metal complex and a second metal complex in a liquid, wherein the first metal complex and the second metal complex comprise a first ligand functionalized with an electron acceptor group; and
exposing the liquid to light comprising one or more wavelengths sufficient to facilitate (i) the formation of an excited state on the first metal complex, (ii) an excited state electron transfer to the electron acceptor group of the first metal complex, and (iii) an irreversible chemical reaction of the electron acceptor group of the first metal complex, wherein the irreversible chemical reaction converts the first ligand of the first metal complex to a second ligand to form a modified first metal complex;
wherein the electron acceptor group has the following structure— wherein each R is independently selected from hydrogen, $C_1$-$C_{20}$ hydrocarbyl, $NO_2$, or CN, and the anion is selected from $BF_4^-$ or $PF_6^-$;
wherein the first ligand comprises acetylacetone (acac), dipicolinic acid (DPA), terpyridine (tpy), diethylenetriaminepentaacetic acid (DTPA), or a combination thereof;
wherein the first metal complex and the second metal complex independently comprise a lanthanide complex, an actinide complex, an Ru(II) complex, an Os(II) complex, or an Fe(II) complex.

2. The method of claim 1, further comprising reducing the modified first metal complex.

3. The method of claim 2, wherein the reducing of the modified first metal complex comprises contacting the modified first metal complex with a reducing agent.

4. The method of claim 2, wherein the reducing of the modified first metal complex is achieved by the liquid.

5. The method of claim 1, further comprising separating the modified first metal complex from the second metal complex.

6. The method of claim 1, wherein the first metal complex is a Cm(III) complex, and the second metal complex is an Am(III) complex; or wherein the first metal complex is an Am(III) complex, and the second metal complex is a Cm(III) complex.

7. A method of separation comprising:
providing a first metal complex and a second metal complex in a liquid, wherein the first metal complex and the second metal complex comprise a first ligand functionalized with an electron acceptor group; and
exposing the liquid to light comprising one or more wavelengths sufficient to facilitate (i) the formation of an excited state on the first metal complex, (ii) an excited state electron transfer to the electron acceptor group of the first metal complex, and (iii) an irreversible chemical reaction of the electron acceptor group of the first metal complex, wherein the irreversible chemical reaction converts the first ligand of the first metal complex to a second ligand to form a modified first metal complex;
wherein the first metal complex is $Nd(tpy\text{-}ph\text{-}N_2)(NO_3)_3(BF_4)$, and the second metal complex is $Eu(tpy\text{-}ph\text{-}N_2)_3(NO_3)_3(BF_4)_3$; or wherein the first metal complex is $Eu(tpy\text{-}ph\text{-}N_2)_3(NO_3)_3(BF_4)_3$, and the second metal complex is $Nd(tpy\text{-}ph\text{-}N_2)_3(NO_3)_3(BF_4)$.

8. A method of separation comprising:
providing a first metal complex and a second metal complex in a liquid, wherein the first metal complex and the second metal complex comprise a first ligand functionalized with an electron acceptor group; and
exposing the liquid to light comprising one or more wavelengths sufficient to facilitate (i) the formation of an excited state on the first metal complex, (ii) an excited state electron transfer to the electron acceptor group of the first metal complex, and (iii) an irreversible chemical reaction of the electron acceptor group of the first metal complex, wherein the irreversible chemical reaction converts the first ligand of the first metal complex to a second ligand to form a modified first metal complex;
wherein the first metal complex is $Ru(tpy\text{-}Ph\text{-}N_2^+)_2(PF_6)_4$, and the second metal complex is $Fe(tpy\text{-}Ph\text{-}N_2^+)_2(PF_6)_4$; or wherein the first metal complex is $Fe(tpy\text{-}Ph\text{-}N_2^+)_2(PF_6)_4$, and the second metal complex is $Ru(tpy\text{-}Ph\text{-}N_2^+)_2(PF_6)_4$.

* * * * *